Patented Dec. 18, 1934

1,984,404

UNITED STATES PATENT OFFICE

1,984,404

TETRAIODOPHENOLPHTHALEIN COMPOSITIONS

Esco F. Ellzey, deceased, late of Snyder, N. Y., by Henry W. Wendt, Jr., administrator, Buffalo, N. Y., assignor to National Aniline & Chemical Company, Inc., New York, N. Y., a corporation of New York No Drawing. Application September 26, 1931, Serial No. 565,406

10 Claims. (Cl. 167—95)

This invention relates to a composition for oral administration in connection with cholecystography. It relates particularly to a composition containing an alkali-metal salt of tetraiodophenolphthalein in a form particularly adapted for oral administration.

Among the compounds which have been employed to render the gall-bladder opaque to roentgen rays, tetraiodophenolphthalein has been found to be particularly valuable in view of its high coloring power and its relative simplicity of manufacture. The introduction of this substance into the gall-bladder has entailed considerable difficulty, however, owing to the peculiar physical and physiological properties of the compound. Free tetraiodophenolphthalein is very insoluble in water, and its mono-alkali-metal salts are also relatively insoluble in water, but the dialkali-metal salts are readily soluble in water.

The disodium salt of tetraiodophenolphthalein, in view of its solubility in water, would appear to be the preferable form in which to administer the compound, and it was in fact employed early in the development of cholecystography. Thus, it was intravenously injected or it was orally administered in the form of an aqueous solution. The administration of the disodium salt by injection is highly undesirable, however, as it generally results in discomfort of the patient and objectionable reactions such as headache, dizziness, nausea and weakness. The oral administration of an aqueous solution of the disodium salt is objectionable as it generally produces nausea and emesis, with the further result that an insufficient amount of the compound is retained by the stomach to produce a satisfactory shadow, so that repeated doses must be taken. The use of an aqueous solution of the disodium salt of tetraiodophenolphthalein has the further objection that the compound in aqueous solution is unstable and, upon standing, decomposes with loss of iodine, so that solutions of the disodium salt cannot be prepared considerably in advance of the time of use and must, therefore, be prepared by the roentgenologist.

It was, therefore, proposed to employ other forms of the compound than its disodium salt. In the co-pending application of Esco F. Ellzey, Serial No. 248,570, filed January 21, 1928, which application has matured into Patent No. 1,858,142, patented May 10, 1932, there are described preparations including, for example, colloidal suspensions of the mono-sodium salt of tetraiodophenolphthalein which preparations may be employed for oral administration in connection with cholecystography; and although results obtained with these preparations are much superior to those obtained with prior preparations, it has been found that the colloidal suspensions of the mono-sodium salt of tetraiodophenolphthalein have a tendency to separate upon standing for a long time.

An object of the present invention is to provide a composition containing an aqueous solution of an alkali-metal salt of tetraiodophenolphthalein which can be administered orally, which will in general not produce nausea or otherwise undesirably affect the system of persons taking the preparation, and which will be readily concentrated in the gall-bladder so as to produce roentgen photographs.

Another object of the invention is to produce a preparation containing an alkali-metal salt of tetraiodophenolphthalein in the form of an aqueous solution which is stable, that is, does not decompose or settle out upon standing, and which, therefore, may be prepared a considerable time in advance of its use.

Other objects of the invention will in part be obvious and will in part appear hereinafter.

It has been found, according to the present invention, by incorporating a protective colloid or other reagent or substance which exerts a similar protective action, and preferably also a buffer salt, into an aqueous solution of an alkali-metal salt of tetraiodophenolphthalein, that a composition is obtained which may be orally administered to man without producing the undesirable effects such as nausea and emesis which ordinarily result from the oral administration of aqueous solutions of the salt alone. The resulting composition may be taken by the patient without discomfort, is well retained by the stomach, and gives excellent gall-bladder visualization.

By way of explanation, but without limiting the invention in any way to any theory of action, it may be assumed, when the composition of the present invention is introduced into the stomach by oral administration, that the buffer salt and the protective colloid act to prevent the hydrochloric acid and other acid digestive juices in the stomach from converting the alkali-metal salt of the tetraiodophenolphthalein to a sticky pasty mass; or, if the tetraiodophenolphthalein is converted into the free compound by the stomach acids, the conversion is produced gradually and the resulting product is in a finely divided and dispersed or colloidal form. As a consequence, the composition readily passes into the intestine and, owing to its finely divided condition, is readily absorbed.

It has furthermore been found, according to the present invention, that the dialkali-metal salts of tetraiodophenolphthalein can be stabilized and decomposition thereof with loss of iodine can be greatly reduced or substantially prevented by making the aqueous solution of the dialkali-metal salt slightly less alkaline than the solutions obtained merely by dissolving the dialkali-metal salt in water.

The invention accordingly comprises the products possessing the features, properties and relation of constituents, and the steps and the relation of one or more of such steps with others thereof which will all be exemplified in the products and processes hereinafter disclosed. The scope of the invention will be indicated in the claims.

According to the present invention, solutions may be prepared of tetraiodophenolphthalein in the form of its alkali-metal salt which solutions may be orally administered to man without causing discomfort and undesirable reactions, by mixing together in aqueous solution the dialkali-metal salt of tetraiodophenolphthalein and a protective colloid (or other substance or reagent having a similar protective action). Preferably a buffer salt is also added. In order to render the mixture more palatable, a sweetening and/or flavoring agent may be added thereto; and in order to modify the color of the composition so as to simulate a natural product of corresponding flavor, a suitable coloring agent may be added. If the composition is to be permitted to stand for a considerable time before it is used, it may be stabilized by adjusting its alkalinity (hydrogen ion concentration), if necessary, to a value at which decomposition of the tetraiodophenolphthalein dialkali-metal salt is substantially eliminated.

The protective colloids or other substances having a similar or analogous protective action (which substances will all be referred to herein by the generic expression "protective agent") that may be employed in accordance with the present invention comprise the edible or non-toxic protective colloids (as for example, gelatine, gum arabic, gum tragacanth, starch, dextrin, soluble starch, edible glue, etc.), carbohydrates having a protective action (as for example, glucose, levulose, cerelose (corn sugar), etc.), and the like.

The buffer salts which may be employed in accordance with the invention comprise the inert or non-toxic alkali-metal salts of the organic and inorganic acids which exert a buffer action on the acid juices of the stomach, as for example, the alkali-metal salts (whether acid, basic or neutral) of malic acid, tartaric acid, citric acid, phosphoric acid, boric acid, etc. The sodium salts of the organic polycarboxylic acids, and particularly of those which occur in fruit juices, are preferably employed. The buffer salt may be incorporated into the composition either as such or it may be prepared in the composition from its constituents. Mixtures of two or more buffer salts also may be used.

The amounts of protective agent and buffer salt employed in proportion to the tetraiodophenolphthalein salt may vary within considerable limits, the particular proportions in any given composition depending upon the specific protective agent and buffer salt employed. An amount of protective agent is preferably employed which is at least sufficient to produce a colloidal suspension of tetraiodophenolphthalein in the free form upon acidification of the tetraiodophenolphthalein salt employed. The amount of buffer salt used should not be so great as to cause separation of the protective agent out of solution. An amount of buffer salt is preferably employed such that the molar ratio of alkali-metal in the buffer salt, or mixture of buffer salts, relative to the tetraiodophenolphthalein compound employed will be about 0.7–0.9, and particularly about 0.80–0.85.

In order to render the tetraiodophenolphthalein alkali-metal salt stable, so that the composition may be permitted to stand for long periods of time, the solution may be rendered less alkaline than the solutions ordinarily resulting from the solution of the dialkali-metal salt of tetraiodophenolphthalein in water. For this purpose, an acid (as for example, a mineral acid or an organic acid, such as an organic carboxylic acid) may be added to the composition. Or instead of an acid, an acid salt may be employed. Thus, the whole or a part of the buffer salt may be of a sufficiently acid character to reduce the alkalinity of the solution to a point sufficient to stabilize the tetraiodophenolphthalein salt.

The amount of acid or salt employed may vary within wide limits. Preferably an amount of acid or its equivalent is employed which is adapted to result in the presence in the final composition of at least about 2–7 per cent. of the tetraiodophenolphthalein in the form of the mono-alkali-metal salt and the remainder in the form of the dialkali-metal salt, inasmuch as such an amount of the mono-alkali-metal salt appears to be soluble in a solution of the dialkali-metal salt. Greater amounts of acid or equivalent may be employed if desired, but in such cases a portion of the mono-alkali-metal salt of the tetraiodophenolphthalein will be in colloidal suspension and not in solution. Lesser amounts of acid or equivalent may be employed when the composition is not required to stand for any considerable period of time, and if desired, the composition may contain the tetraiodophenolphthalein wholly in the form of the dialkali-metal salt. Preferably, acid or its equivalent is employed, however, inasmuch as the palatability of the composition is increased when a portion of the tetraiodophenolphthalein is present in the form of the mono-alkali-metal salt.

The invention will be illustrated by the following specific examples describing representative products and processes of producing said products. The invention is not limited thereto, however, inasmuch as changes may be made in the ingredients, proportions and method of preparing the compositions without departing from the scope of the invention.

*Example 1.*—3000 grams of tetraiodophenolphthalein disodium salt and 190 grams of gelatin are dissolved in about 16 liters of water which is at a temperature of 70° to 80° C. in order to facilitate solution. The solution is cooled to 30° to 40° C., and there is added a solution of 200 grams of crystallized citric acid and 108 grams of sodium hydroxide in 2 liters of water. (This is equivalent to the addition of 232.2 grams of trisodium citrate and about 10 grams of citric acid, or 205.4 grams of trisodium citrate and 36.8 grams of disodium citrate.) The whole is then made up to a volume of 19.5 liters by addition of water. Approximately 6.5 per cent. of the tetraiodophenolphthalein in this preparation is in the form of the monosodium salt in solution or in colloidal suspension, and the balance is in the form of the disodium salt in solution. In order to render the composition more pleasing in appearance and taste 35 grams of saccharin, 7 grams of methyl anthranilate and 150 grams of erythrosine (Colour index No. 773) may be mixed with the composition to simulate the flavor and color of grape juice.

*Example 2.*—600 grams of disodium tetraiodophenolphthalein and 38 grams of gelatin are dissolved in 3 liters of water at about 70° to 80° C. The solution is cooled to about 30° to 40° C., and a solution containing 64 grams of citric acid and 20 grams of sodium hydroxide in 0.4 liter water is added. (This proportion of citric acid and caustic soda corresponds to 59 grams of disodium citrate and 11 grams citric acid or 45.5 grams of disodium citrate and 24.5 grams of monosodium citrate.) In this composition approximately 60 per cent. of the tetraiodophenolphthalein is in the form of its monosodium salt in suspension or in solution, and the balance is present as the disodium salt. To the resulting solution 0.6 gram of soluble saccharin, 30 grams of erythrosine and 1.18 grams of methyl anthranilate are added as coloring and flavoring agents.

*Example 3.*—400 grams of tetraiodophenolphthalein disodium salt and 267 grams of cerelose (corn sugar) are dissolved in about 2 liters of water at about 70° to 80° C. The solution is cooled to about 30° C. and a solution containing 26.7 grams of crystallized citric acid and 14.4 grams of sodium hydroxide is added. (This proportion of sodium hydroxide and citric acid corresponds to 31. grams trisodium citrate and 1.37 grams citric acid, or 27.3 grams of trisodium citrate and 5.0 grams of disodium citrate.) Approximately 6.5 per cent. of the tetraiodophenolphthalein in this preparation is in the form of the monosodium salt in solution or in colloidal suspension, and the balance is in the form of the disodium salt in solution. The resulting solution is sweetened by addition of about 5 grams saccharin, and is colored by the addition of 20 grams erythrosine. 20 cc. of lemon extract and 30 cc. of orange extract are added to flavor the preparation, and sufficient water is added to make up a volume of 2.6 liters.

Since changes may be made in carrying out the above process of the invention, and modifications may be made in the above compositions which embody the invention without departing from its scope, it is intended that all matter contained in the above description shall be interpreted as illustrative and not in a limiting sense, except as limited by the appended patent claims.

What is claimed is:

1. A composition for oral administration comprising an aqueous solution of a dialkali-metal salt of tetraiodophenolphthalein, a protective agent, and a non-toxic alkali metal salt which exerts a buffer action on the acid juices of the stomach, the amount of protective agent being at least sufficient to produce a colloidal suspension of tetraiodophenolphthalein in the free form upon acidification of the tetraiodophenolphthalein salt.

2. A composition for oral administration comprising an aqueous solution of the disodium salt of tetraiodophenolphthalein, a protective colloid, and a non-tonic alkali-metal salt of a polycarboxylic acid, the amount of protective colloid being at least sufficient to produce a colloidal suspension of tetraiodophenolphthalein in the free form upon acidification of the tetraiodophenolphthalein salt.

3. A composition for oral administration comprising an aqueous solution of the disodium salt of tetraiodophenolphthalein, a protective colloid, and a sodium salt of a polybasic organic acid which occurs in a fruit juice, the amount of protective colloid being at least sufficient to produce a colloidal suspension of tetraiodophenolphthalein in the free form upon acidification of the tetraiodophenolphthalein salt.

4. A composition for oral administration comprising an aqueous solution of the disodium salt of tetraiodophenolphthalein, gelatin, and a sodium salt of citric acid, the amount of gelatin being at least sufficient to produce a colloidal suspension of tetraiodophenolphthalein in the free form upon acidification of the tetraiodophenolphthalein salt.

5. A composition for oral administration comprising an aqueous solution of the disodium salt of tetraiodophenolphthalein, gelatin, and trisodium citrate, the amount of gelatin being at least sufficient to produce a colloidal suspension of tetraiodophenolphthalein in the free form upon acidification of the tetraiodophenolphthalein salt.

6. A composition for oral administration comprising an aqueous solution of the disodium salt of tetraiodophenolphthalein, a small amount of the monosodium salt of tetraiodophenolphthalein, a protective agent, and a sodium salt of citric acid, the amount of protective agent being at least sufficient to produce a colloidal suspension of tetraiodophenolphthalein in the free form upon acidification of the tetraiodophenolphthalein salt.

7. A composition for oral administration comprising tetraiodophenolphthalein of which at least 93 per cent is in the form of the disodium salt, water, gelatin, and a sodium salt of citric acid, a flavoring agent, and a coloring agent, the amount of gelatin being at least sufficient to produce a colloidal suspension of tetraiodophenolphthalein in the free form upon acidification of the tetraiodophenolphthalein salt.

8. The process of producing a composition for oral administration, which comprises mixing together the disodium salt of tetraiodophenolphthalein, water, a protective agent, and a sodium salt of a polybasic acid which occurs in a fruit juice, and controlling the acidity of the resulting mixture so that at least 93 per cent. of the tetraiodophenolphthalein is in the form of the disodium salt, the amount of protective agent being at least sufficient to produce a colloidal suspension of tetraiodophenolphthalein in the free form upon acidification of the tetraiodophenolphthalein salt.

9. The process of producing a composition for oral administration, which comprises mixing together the disodium salt of tetraiodophenolphthalein, water, gelatin, trisodium citrate, and sodium acid citrate in an amount such that about 2 to 7 per cent. of the tetraiodophenolphthalein is in the form of the monosodium salt and the remainder is in the form of the disodium salt, the amount of gelatin being at least sufficient to produce a colloidal suspension of tetraiodophenolphthalein in the free form upon acidification of the tetraiodophenolphthalein salt.

10. A composition for oral administration comprising an aqueous solution of the disodium salt of tetraiodophenolphthalein, gelatin, and a sodium salt of citric acid, the weight ratio of the disodium salt of tetraiodophenolphthalein to the gelatin being about 300:19.

HENRY W. WENDT, Jr.,
*Administrator of the Estate of Esco F. Ellzey, Deceased.*